United States Patent
Sawyer (10) Patent No.: US 7,083,184 B2
(45) Date of Patent: Aug. 1, 2006

(54) COLLAPSIBLE UTILITY TRAILER

(75) Inventor: William Crayton Sawyer, 506 W. 7th St., Clarksville, TX (US) 75426

(73) Assignee: William Crayton Sawyer, Clarksville, TX (US)

(*) Notice: Subject to any disclaimer, the term of this patent is extended or adjusted under 35 U.S.C. 154(b) by 136 days.

(21) Appl. No.: 10/680,799

(22) Filed: Oct. 7, 2003

(65) Prior Publication Data

US 2004/0217578 A1   Nov. 4, 2004

Related U.S. Application Data

(60) Provisional application No. 60/416,563, filed on Oct. 7, 2002.

(51) Int. Cl.
*B62B 1/12* (2006.01)

(52) U.S. Cl. .................. 280/656; 280/491.1; 280/64

(58) Field of Classification Search ............... 280/656, 280/651, 652, 415.1, 491.1, 491.4, 38, 39, 280/40, 63, 64; 296/26.03, 26.13, 26.15
See application file for complete search history.

(56) References Cited

U.S. PATENT DOCUMENTS

| | | | |
|---|---|---|---|
| 2,826,425 A | 7/1955 | Hoeper | |
| 2,879,072 A | 10/1956 | Real et al. | |
| 3,073,615 A * | 1/1963 | Elmer | 280/37 |
| 3,367,675 A | 7/1966 | Gearin | |
| 3,403,924 A | 7/1966 | Oliveira | |
| 3,781,030 A | 12/1973 | Ekedal | |
| 4,126,324 A * | 11/1978 | Browning | 280/42 |
| 4,175,768 A | 11/1979 | Thackray | |
| 4,239,258 A | 12/1980 | Burris | |
| 4,253,677 A * | 3/1981 | Wissler | 280/40 |
| 4,362,316 A | 12/1982 | Wright | |
| 4,624,467 A * | 11/1986 | Burns | 280/40 |
| 4,669,743 A * | 6/1987 | Tipke | 280/42 |
| 4,746,142 A | 5/1988 | Davis | |
| 4,758,008 A | 7/1988 | Moddejonge | |
| 4,768,806 A | 9/1988 | Tetreault | |
| 4,995,129 A * | 2/1991 | Comardo | 14/71.1 |
| 5,340,134 A | 8/1994 | Dodson | |
| 5,607,176 A | 3/1997 | Leib et al. | |
| 5,924,836 A * | 7/1999 | Kelly | 414/482 |
| 5,941,542 A * | 8/1999 | Kalman | 280/38 |
| 6,164,683 A * | 12/2000 | Kalman | 280/656 |
| 6,585,285 B1 * | 7/2003 | Koch | 280/656 |
| 6,733,026 B1 * | 5/2004 | Robberson et al. | 280/415.1 |
| 6,824,152 B1 * | 11/2004 | Scott | 280/79.7 |
| 2003/0160426 A1 * | 8/2003 | Liljeberg et al. | 280/402 |
| 2005/0093273 A1 * | 5/2005 | McDonell | 280/656 |

FOREIGN PATENT DOCUMENTS

CA          252506          8/1925

* cited by examiner

*Primary Examiner*—Jeff Restifo (57) ABSTRACT

A vehicular collapsible trailer comprising a platform (11) made of two longitudinal sections (28, 30) hingely mounted about a third central section (20). Front and rear flanges (16, 22) abut against the longitudinal sections and maintain the platform in its load carrying position. Two flanges (64A, 64B) along the distal ends of the longitudinal sections abut against central section to provide a folded trapezoid stowage position. Suspension joints (52) are fixed about the exterior edges of the longitudinal sections, and collapsible arms (82, 84) joined to axle (66) facilitate the platforms' progression to open and closed positions. A permanent hub (70) and wheel assembly is mounted to each axle end.

12 Claims, 6 Drawing Sheets

COLLAPSIBLE UTILITY TRAILER

CROSS-REFERENCE TO RELATED APPLICATIONS

This application claims the benefit of Provisional Patent Application Ser. No. 60/416,563, filed 2002 Oct. 7th.

FEDERALLY SPONSORED RESEARCH

Not Applicable

SEQUENCE LISTING OR PROGRAM

Not Applicable

BACKGROUND OF THE INVENTION

1. Field of the Invention

The present invention pertains generally to utility trailers, specifically to a collapsible integrant to provide better amenity when stored.

2. Background of the Invention

The American public as a whole has become an increasingly mobile society and given their affinity for personalized vehicular modes of travel via automobiles, trucks, and SUVs', the sight of additional cargo in tow by trailer is a common one. Many of these commercial utility trailer products assume a variety of dimensions, shapes, and carrying capacities as set by their manufacturers. These conventional utility trailers are durable but burdensome due to their overall general preponderance. Because of the conforming manner of their construction, the typical utility trailer is unable to break down easily for suitable storage; thus often necessitating considerable space when not in use. Alternatively, if the utility trailer is cached outdoors, prolonged exposure to the elements may subject the unit to consequential wear and tear in excess of manufacturer recommendations. Thus, there is a need for a collapsible integrant to be particularly applicable within the utility trailer to provide ease of convenience when preparing for storage; yet able to retain the qualities of durability and weight carrying capacity as the conventional utility trailer.

Collapsible trailers are known in the art and are typically formed with a bed comprised of one rear portion and one front portion. The collapsible integrant of U.S. Pat. No. 5,607,176 to Leib and Thurm (1994) is capable of supporting great weights but is of limited portability when placed in its vertical, storing position. Secondly, this trailer although containing a support assembly to retain the unit in an upright position is somewhat burdensome when being placed in its storage position due to its high center of gravity. Consequently, the unit requires great care to disassemble for storage when not in use by the operator. Third, the trailer frame constructed, primarily for the transport of motorcycles, jet skis, and the like disassembles to the stowed size of approximately twenty-two inches deep and eighty inches high. These dimensions render the folded, stowed configuration a size undesirable to the typical consumer.

U.S. Pat. No. 4,768,806 issued to Tetreault (1988) discloses a collapsible trailer having a platform comprised of two longitudinal sections, which fold against one another along a central axis. The procedure for folding and thus, storing the invention is initiated by the removal of a pin to fold the towing bar against its front flange. In addition, a complete removal of the front and rear panels, by the operator is essential in order that the trailer may be completely collapsed; then maneuvered back to a horizontal position on its wheels for storage.

Canadian patent 252,506 to Gleissner (1925) featured a collapsible trailer having a complex arrangement of multiple parts, thus substantially increasing the number of steps necessary to disassemble when not in use. Both wheel and axle are joined to the body of the trailer by a series of leaf springs and spring brackets, affixed by nuts and bolts. Thereafter, the removal of these nuts frees the springs from the axle to permit the folding of the trailer body. Subsequently, an operator must detach the axle from the trailer body, in order that the wheels may be folded flat to rest against the axle.

U.S. Pat. No. 4,362,316 issued to Wright features a folding trailer consisting of a load-bearing platform supported by a chassis. This platform again contains two sections; however, these sections cannot form the load bearing platform until the operator has folded the side boards inwardly by means of hinges. Conversely, additional effort on the part of the operator must be expended in order to attain the stowing position as well. The individual or individuals must apply additional weight, by standing on the trailer's draw bar as the folding operation takes place in order to create the required anticlockwise motion about the wheel axis in order that the trailer may be placed in the storage position.

U.S. Pat. No. 4,239,258 issued to Burris (1978) features an improved retractable fold-up trailer bed constructed in three sections extending transversely across the trailer. This unit provides a fairly large and weight capable trailer able to be folded for storage. However, the operator of the trailer is required to release a plurality of latches to retain the sections of the trailer bed in either folded or unfolded positions. In addition, since it is preferable that the center of gravity of the folded trailer be slightly forward the axis of the wheels; the tongue must be maneuvered and pinned by the operator so that the handle may be utilized to stabilize the stored trailer against a stationary wall, heavy object, or the like.

U.S. Pat. No. 5,340,134 issued to Dodson (1993) discloses a light duty trailer preferably utilized for all-terrain vehicles, which may be folded into a hand-carry able case when not in use. This applicant cites that this less relative prior art was fabricated by Dodson to address the above-noted deficiencies of the previous prior art by providing a relatively lightweight alternative to the somewhat unwieldy and bulky conventional utility trailer. Ideally the preferred towing vehicle is an all-terrain vehicle. It suffers from numerous disadvantages concerning weight carrying capacities and amenity for storage. This embodiment is comprised of a pair of pivoting bed members, pins, wheel assemblies, and their respective axles, all requiring considerable durational effort by the operator in order to assemble and thus, utilize the trailer. Conversely, the trailer may be disassembled to a closed, fully stowed position; yet requires a detachment of the first and second wheel assemblies, including their wheels and axles. Secondly, the bed of the trailer also serves as its stowed case, thereby requiring undue effort by the operator to detach the wheel assemblies, then, arrange their respective wheel assembly supports in an cooperative fashion in order create the carryall "handle" for manual carrying of the trailer. Thirdly, the classification of this unit as a light-duty trailer for ATVs and specifically its use of a mesh screen instead of a solid planar sheet of material for its first and second upper surfaces; accordingly render this embodiment inappropriate for the weight and cargo limits needed in an conventional utility trailer.

U.S. Pat. No. 4,746,142 issued to Davis (1988) features a trailer, which may also be disassembled to a closed "suitcase" position. However, both its weight carrying capacities and ease of assembly to disassembly are finitely limited.

U.S. Pat. No. 3,781,030 granted to Ekedal (1972) devises a lightweight trailer that may be collapsed to occupy a minimum of space. However, the upturned channel members comprising the bed of this unit are designed with motorcycles being the featured cargo, severely limiting its usefulness as an all-purpose utility trailer. In addition, Ekedal's trailer, prior to collapsing the frame, requires that a plurality of bolts be removed in order that the end and side pieces may be pivoted to a collapsed position.

OBJECTS AND ADVANTAGES

Accordingly, besides the objects and advantages of the collapsible trailer depicted in the above patent, several objects and advantages of the present invention are:

(a) to provide a trailer that may be enclosed for storage whose dimensions will allow for manageable size.

(b) to provide a collapsible trailer whose bed is not restricted to specific cargo items.

(c) to provide a collapsible trailer whose towing vehicle is not restrained to a specific class.

(d) to provide a collapsible trailer whose bed is capable of sustaining great weights.

(e) to provide a trailer which is both portable in the stowed position and unoppressive when handled by its operator throughout the duration of the storage preparations.

(f) to provide a trailer, which may be classified as an all-purpose utility trailer yet, can be collapsed for storage.

(g) to provide a collapsible utility trailer whose production allows for a convenient and extremely rapid open position and closed positioning when employed by its operator.

(h) to provide a trailer which will not require a detachment or removal of various parts in order to attain the stowage position.

Further objects and advantages are to provide a collapsible utility trailer bed, which can be folded easily and conveniently without disarrangement of the bed, and devoid of substantial learning necessary on the part of the consumer. The present invention obviates the need to disassemble or rearrange the trailer, which contributes to its speed and general ease of use. Further objects and advantages of the invention will become apparent from a consideration of the drawings and ensuing description.

SUMMARY

Generally, speaking, in accordance with the present invention, the collapsible trailer comprises a platform having a first and second longitudinal section hingeably mounted to a third central section. The platform is pivotable between an open position, wherein the two longitudinal sections join the third in the same plane, and in a closed position wherein the platform is in a folded relation and the longitudinal sections retract vertically in a side-by-side fashion. Furthermore, the various components of the trailer are adapted to be secured by flanges or by locking pins which enable the trailer to be stowed or opened without disassembly procedures thereby necessitating the use of tools.

DRAWINGS—FIGURES

In the drawings, closely related figures have the same number but different alphabetic suffixes.

DRAWINGS—REFERENCE NUMERALS

| | |
|---|---|
| 10. trailer | 11. platform |
| 12A. pin | 12B. pin |
| 13A. chain | 13B. chain |
| 16. front flange | 18R. aperture |
| 18L. aperture | 20. central section |
| 22. rear flange | 24R. aperture |
| 24L. aperture | 26R. section hinge |
| 26L. section hinge | 28. right lateral section |
| 28A. floor support | 28B. floor support |
| 30. left lateral section | 30A. floor support |
| 30B. floor support | 32. support location |
| 34. support location | 36. support location |
| 38. support location | 44. support member |
| 46. support member | 48. outer side of right lateral section |
| 50. outer side of left lateral section | 52R. rotating suspension joint |
| 52L rotating suspension joint | 56. leaf spring |
| 60. tubing | 62A. front spring hanger |
| 62B. rear spring hanger | 64A. cylindrical flange |
| 64B. cylindrical flange | 66. axle |
| 68. spring mounting bracket | 70. hub |
| 72. stationary section | 74A. aperture |
| 74B. aperture | 75. point on arm |
| 78. point on stationary section | 80. central kingpin |
| 82. left second arm | 84. right first arm |
| 86. aperture | 88. "L" shaped flange |
| 90. aperture | 92A. aperture |
| 92B. aperture | 94A. bolt |
| 94B. bolt | 96. aperture |
| 98. kingpin | 100. rectangular flange |
| 102. mounting bracket | 104. aperture |
| 106A. aperture | 106B. aperture |
| 108A. aperture | 108B. aperture |
| 110A. bolt | 110B. bolt |
| 112A. pulley | 112B. pulley |
| 114. cable | 116. winch |
| 120. hitch | 122. hinge |

DETAILED DESCRIPTION-PREFERED EMBODIMENT

Figure 1:
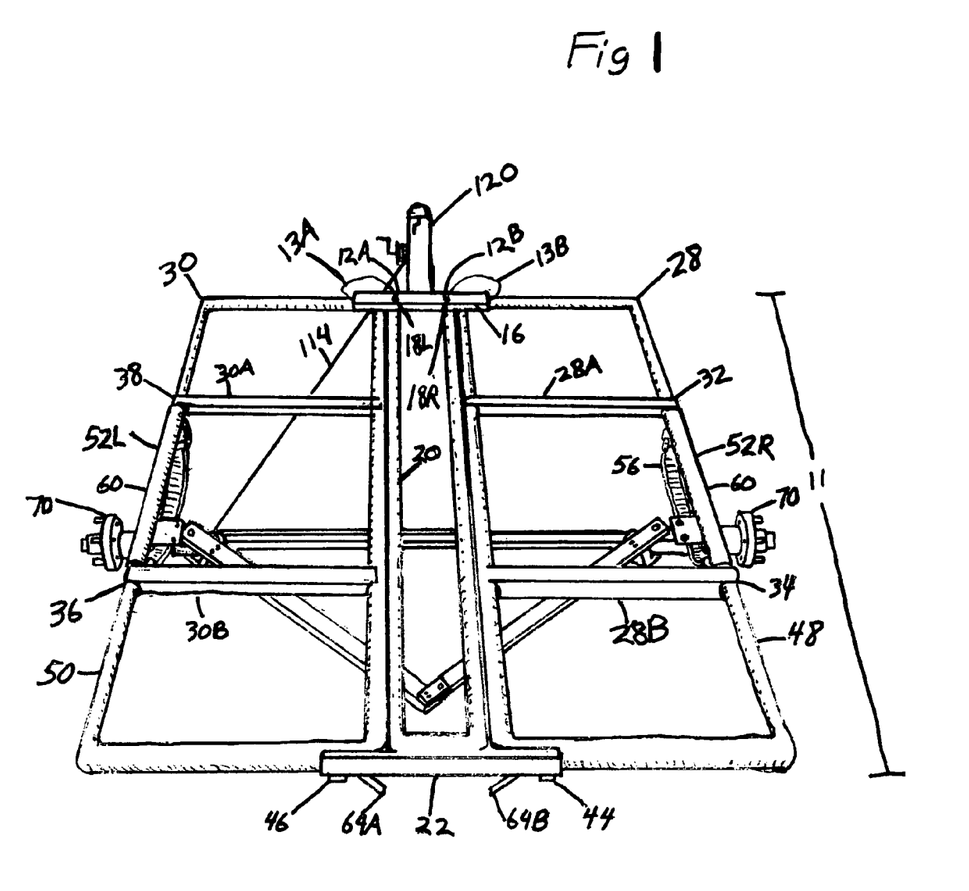
FIG. 1 is a perspective view of the collapsible trailer constructed in accordance with the invention in the open position.
Figure 2:
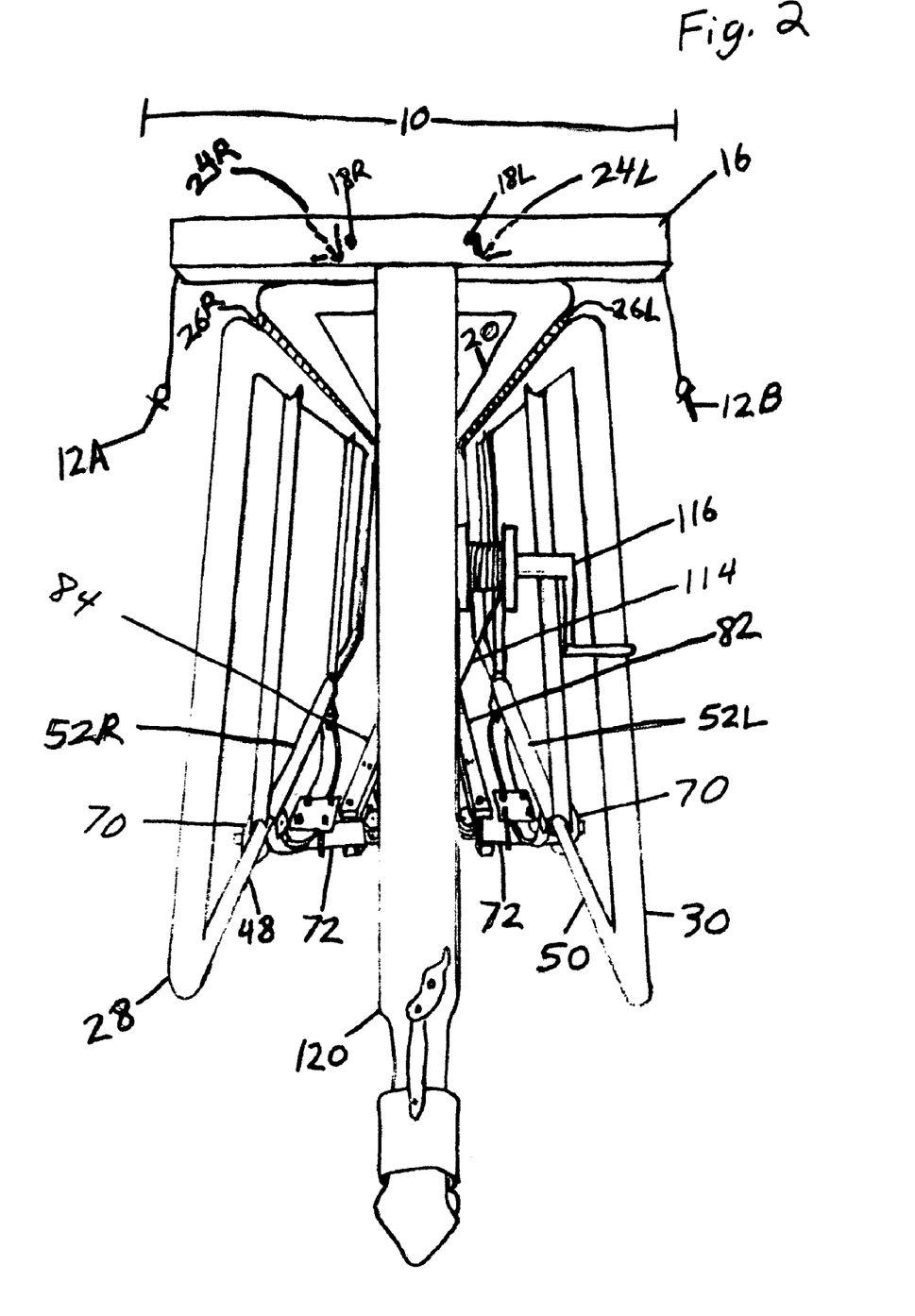
FIG. 2 is a front perspective view of the collapsible trailer constructed in accordance with the invention in the closed position.
Figure 6:
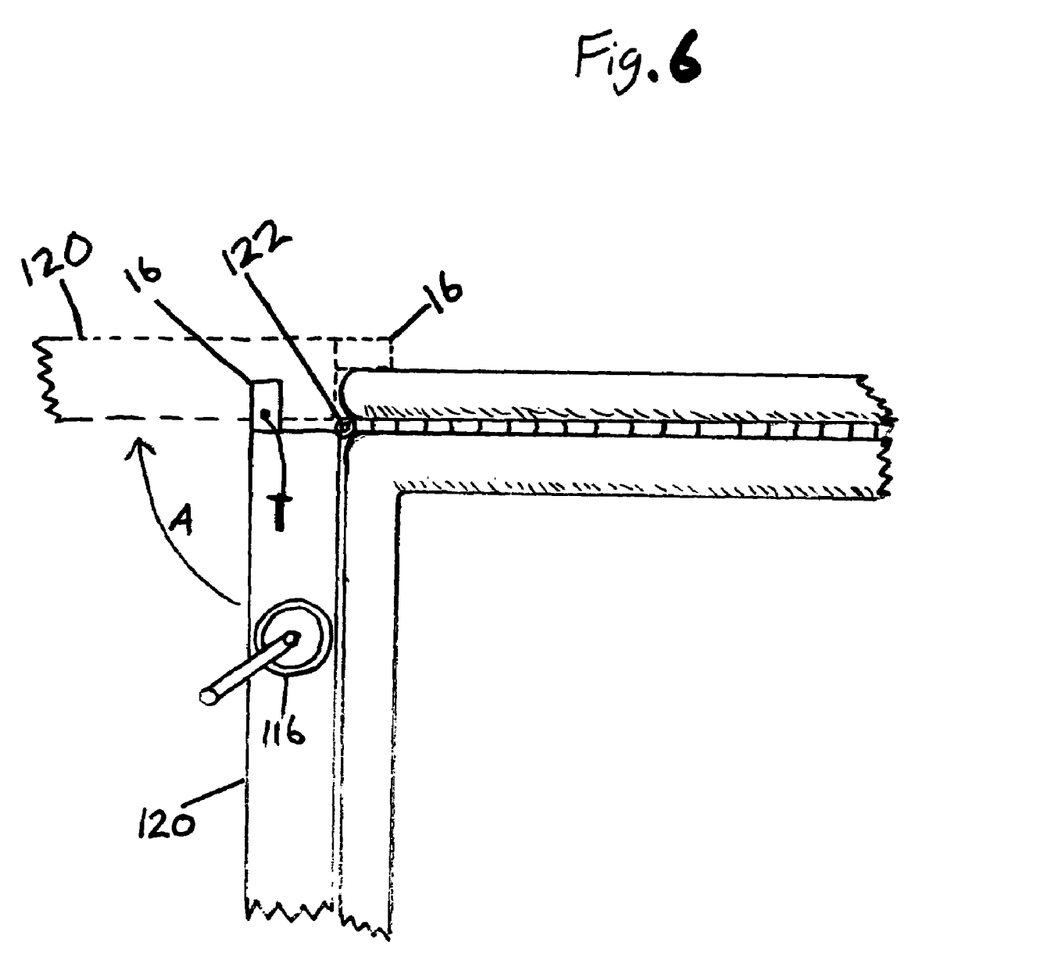
FIG. 6 is a side elevational view of a hitch as coupled to the trailer according to the invention.

Referring to the Figures and in particular to FIG. 1, the trailer 10 comprises a platform 11 made up of a pair of longitudinal sections hingeably mounted about a third central axial section 20. Steel tubing may be employed for construction of the trailer sections and is the preferred material of the embodiment. A rear flange 22 is employed to hold the platform parallel during utility and is mounted horizontally to the distal end of the central section so that the ends of the flange may protrude past the width of the central section. A frontal flange 16 is adapted to contain two right and left apertures 18R and 18L and permit manual insertion of locking pins 12A and 12B through said flange and extending through the aligned apertures 24R and 24L of the central section 20. As illustrated in FIGS. 1,2, and 6, the front flange is additionally welded to a hitch 120 and is exercised to hold said hitch in an upright manner when said pair of locking pins affixed with their respective corresponding standard chains 13A and 13B, attached to said flange 16, are inserted through these corresponding apertures. In addition, a frontal hinge 122 is coupled by welding to both the hitch 120 and the proximal end of the central section 20. When the collapsible trailer is in the open (unfolded) position the flange 16 will reside atop central section 20 with this section disposed substantially between flange 16 and the hinge 122 as illustrated in FIG. 6. By incorporating such an assembly, trailer 10 is alleviated in the action of retaining the platform substantially parallel in its' load carrying position.

As illustrated in FIGS. 1 and 6, and specifically to FIG. 2, a set of longitudinal lateral sections 28 and 30 are constructed rectangularly of steel tubing and are considerably wider than said axial section 20 of the preferred embodiment. A pair of section hinges 26R and 26L are located proximately to the interior edges of sections 28 and 30 sandwiched between central section 20. The first and second hinge members 26L and 26R comprise a means for pivotally coupling the first and second sections 28, 30 to the axial section 20, Section hinges 26L and 26R are affixed in such a fashion that, when coupled, the lateral sections 28 and 30 will point downwardly at an angle curtailed of 180 degrees, thus facilitating and easier folding of the platform 11. The first and second hinge members 26L and 26R permit the first and second sections 28 and 30 to be rotated relative to one another to allow the first and second sections to assume 1) an open position wherein the first outer edge 48 is distal from the second outer edge 50 and the upper surfaces of the first, second, and third sections 28, 30 and 20 are substaintially co-planar (as viewed in FIG. 1) and 2.) a closed position wherein the first outer edge 48 is moved immediately closer and parallel to said second outer edge with the third axial section 20 disposed therebetween. (as shown in FIG. 2)

As shown in FIG. 1, an identical pair of cylindrical flanges 64A and 64B are welded ventrally to the distal ends of the sections 28 and 30. These flanges are composed of standardized structural steel and are placed precisely adjacent to hinges 26L and 26R. As the trailer platform 11 collapses, the flanges 64A and 64B are unable to impede the movement of the hinges 26L and 26R but are able to procure a stopping point for the first and second sections 28 and 30, as flanges 64A and 64B, are abutting against central section 20. FIG. 2, which illustrates a plan view of the collapsible trailer in the folded position, displays that the first 28, second 30, and third 20, sections of the trailer bed form as enclosure which is of a generally trapezoidal stowage form for ease in storage and handling. Again, at the rear end of the sections 28, 30 a set support members 44 and 46 are engaged to act as stops are welded to each said inner edge corner of these sections, and protruding externally to lie flush with the distal end of rear flange 22. Furthermore, these said support members act in consort with the rear flange 22 to stabilize the platform 11 in a parallel, load-bearing position during trailer use.

Referring again to FIG. 1 each lateral longitudinal section of the trailer assembly is provided with a pair corresponding floor supports 28A, 28B, 30A, and 30B welded atop each section 28, 30 at the locations 32, 34, 36, and 38. These floor support members extend downwardly from the underside of the flooring and function to provide additional structural integrity to platform 11. Flooring for this trailer bed is not considered to fall within the scope of this disclosure, however the choice would be left to the manufacturer of the device.

Figure 3:
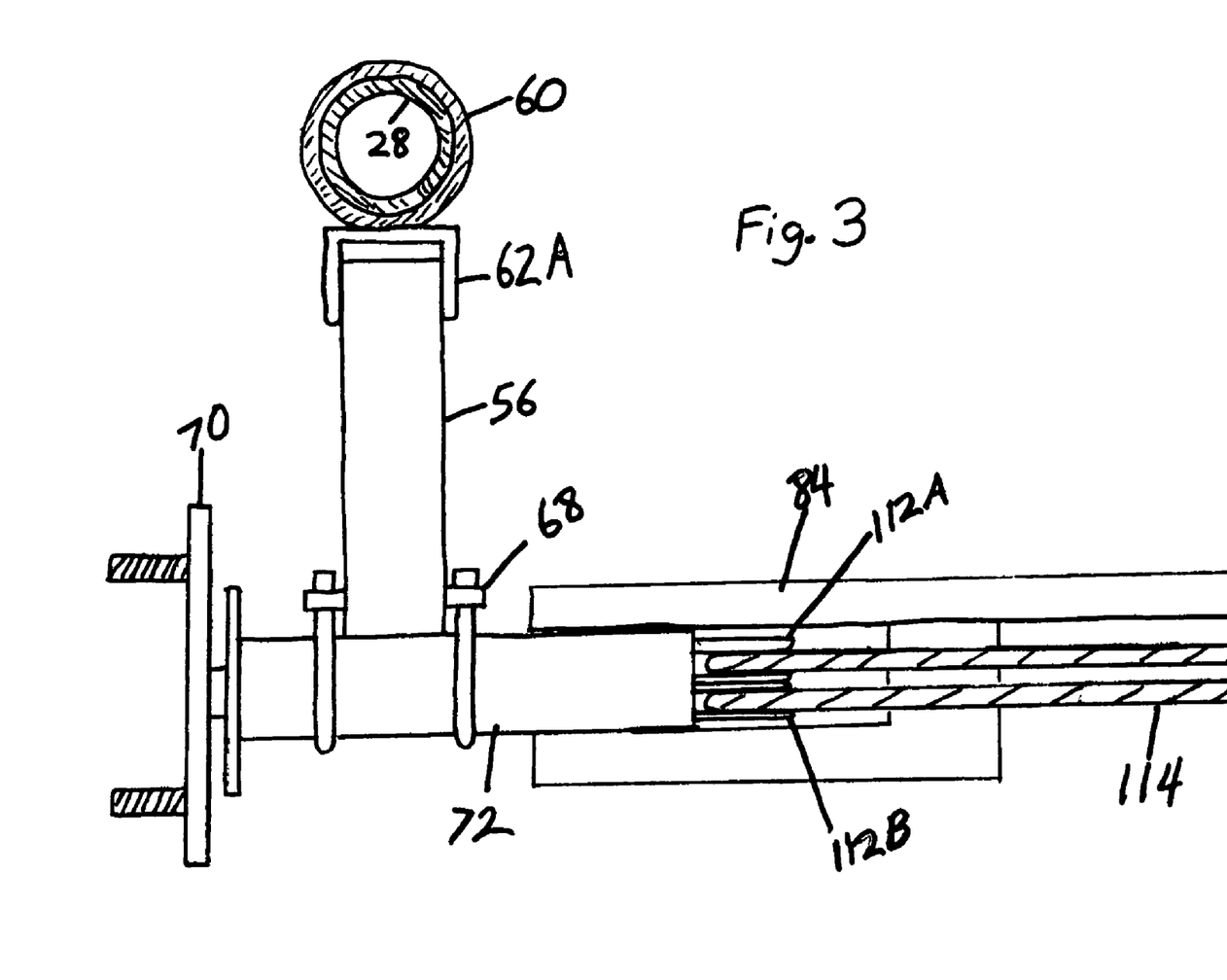
FIG. 3 is a frontal view of the axle assembly.

As viewed in FIG. 1, a first and second suspension means are illustrated regarding the trailer in its expanded configuration. Located at the exterior edges of the first and second lateral section 48 and 50, the suspension means for the trailer is comprised of: rotating suspension joints 52R and 52L, a "double" first and second leaf spring, 56 and their respective spring hangers 62A and 62B. As viewed in the frontal view of a singular axle assembly as seen in FIG. 3, the suspension joint 52R is comprised of steel tubing which has been configured for an insertable, telescopic fit around the exterior, circular edge of the right bed section 28. The dual set of suspension joints 52R and 52L are disposed on transverse relation to floor supports 28A, 28B, 30A, and 30B of each lateral section. As viewed in FIG. 1 of the instant invention, the suspension joints 52R and 52L are constructed to be fixed flush between the floor support members and the first and second bed sections, thereby preventing said suspension joint a non-actuated progression outside the floor support members.

A key feature of the present invention is the means by which the axle assemblies are pivotal between stowed and open positions without need of disassembly, subsequently obviating detachment or tool usage by its' operator. In the preferred embodiment of the invention, the trailer utilizes a straight axle design, adapted to and modified from its' original construction as a common axle joining one wheel to another.

In the preferred embodiment of the first and second stationary sections of the axle are comprised of a straight axle type commonly chosen to be affixed in a relation disposed beneath the leaf springs. Those skilled in the art should find it apparent that the remaining constituent elements connected to the said axle assemblies; including the leaf springs in combination with their spring brackets, wheel assemblies and the hubs, are comprised of typical conventional components of general vehicular/trailer use and are readily available.

Figure 4:
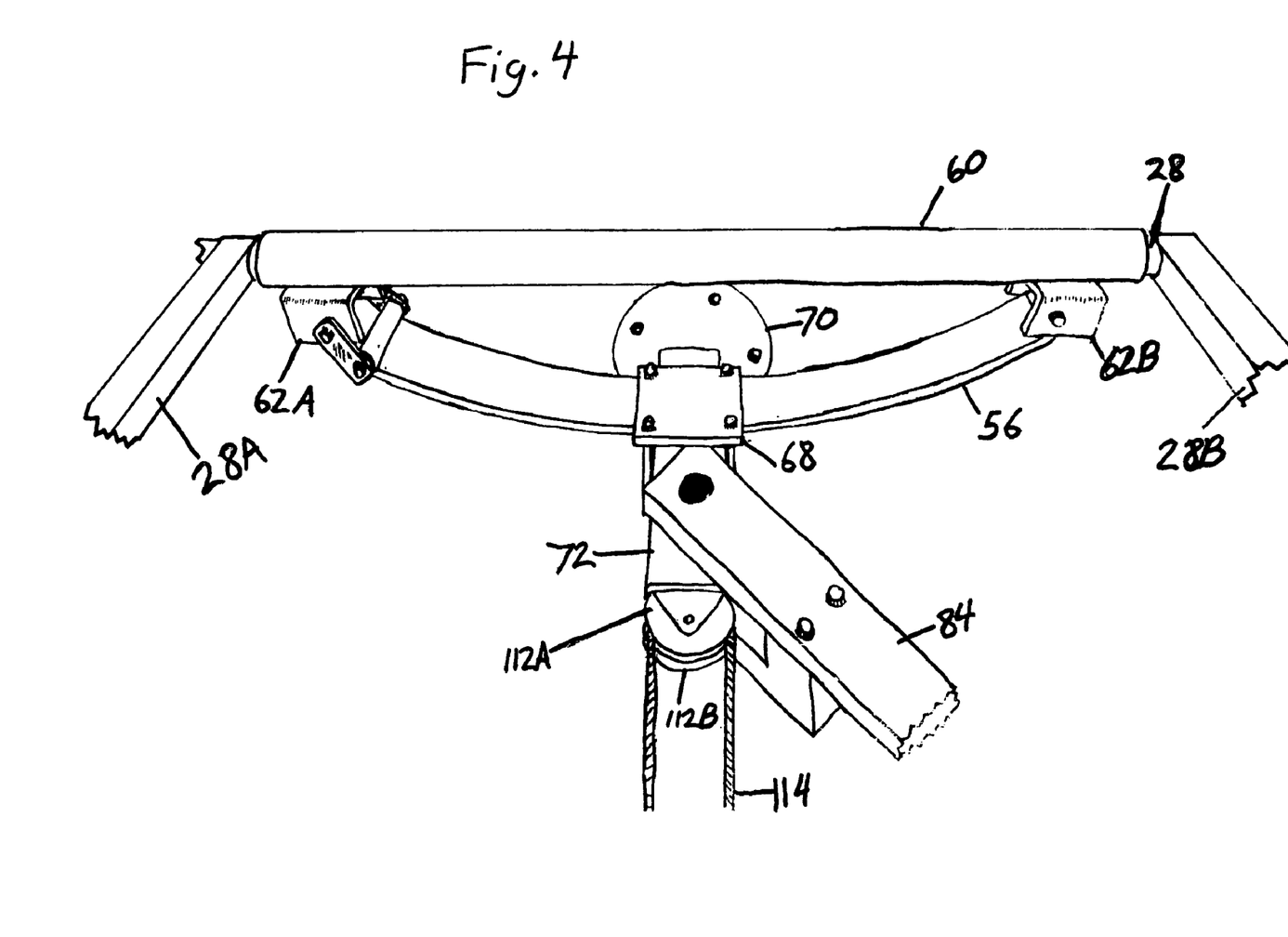
FIG. 4 is an enlarged perspective view of the axle assembly of the trailer according to the invention.
Figure 5:
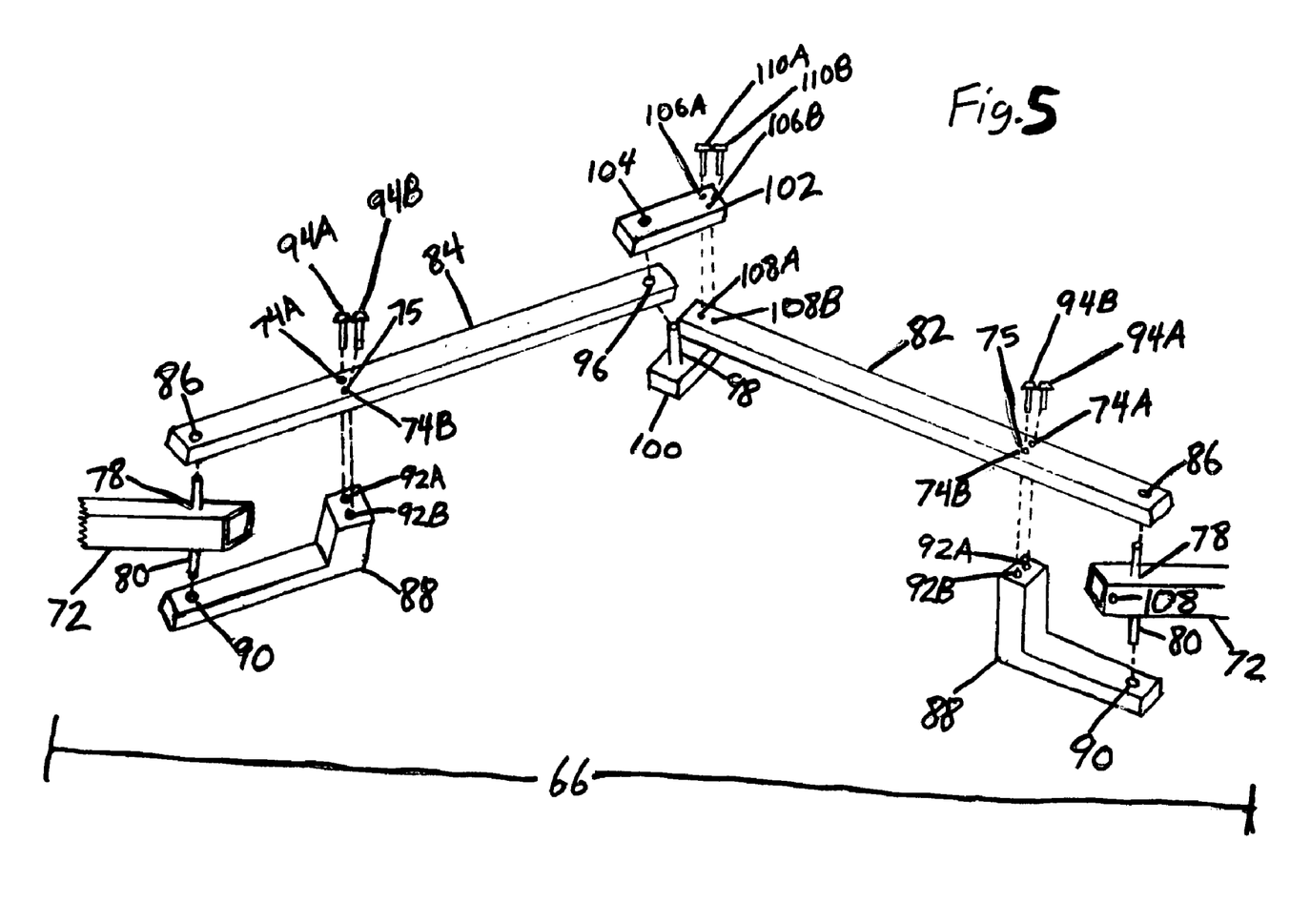
FIG. 5 is a partial exploded view of the axle assembly with arms in accordance with the invention.

As singularly illustrated in FIGS. 3 and 4, the first axle assembly means is comprised of three main elements: a first wheel assembly combined with a hub 70, a stationary section of the axle 72 and a collapsible arm 84. The stationary section is comprised of a square hollow tube which in turn, a leaf spring 56 may be bracketed to the center of said section 72 of the axle. Secondly, the leaf spring is then attached to the tubing 60 of the rotating suspension joint via its respective spring hangers 62A and 62B. The basal location of the leaf spring 56 is then bolted by means of a standard mounting bracket 68 to section 72 of the axle. Referring to FIGS. 3 and 4, the hub 70 and wheel suspension means, upon which the wheel (not shown) is to be bolted resides at the distal end of the stationary axle section 72. As represented in FIG. 5, directly upon area 78 at section 72 is a perpendicularly mounted central kingpin 80, which in turn passes through the axle assembly at section 72. Referring to the exploded view of FIG. 5., first 84 and second 82 collapsible arms each include an identical aperture 86, at their distal ends and an additional pair of identical smaller apertures 74A and 74B, located at point 75, respectively. The first and second arms 84 and 82 are made up of solid, elongated steel, each arm having a length approximately equal to two-thirds platform 11 width It should be noted that the platform width is calculated by utilizing Both sections 28 and 30 and the central section 20 combined. The distal ends of each arm 82 and 84 connect central kingpin 80 within the stationary sections 72 of each axle assembly by passing through an aperture 86. Each arm 82 and 84 have a bolted "L" shaped flange 88 containing identical corresponding apertures 90 at their proximal ends and also have two smaller identical apertures 92A and 92B located at the base end of this flange 88.

Referring again to FIG. 5, the flange 88 is mounted by two varied means at two different locations. It is permanently coupled at the proximal end of the flange by utilizing a corresponding bolt pair 94A and 94B, which are inserted through apertures 74A and 74B upon the said first and second arms, terminating through apertures 92A and 92B upon said flange. Secondly, the "L" shaped flange is pivotally mounted at its distal end by first inserting kingpin 80 through aperture 86 then ending at aperture 90 located distally upon flange 88.

Located at the frontal end of the right arm 84, an aperture 96 permits the insertion of a kingpin 98. This kingpin is mounted on a rectangular flange 100 projecting from the base of said left arm. In addition, a mounting bracket 102 comprised of solid metal contains an aperture 104 and pair of aligned, smaller apertures 106A and 106B as seen in FIG. 5. Aperture 104 receives the kingpin 98 and thus bracket 102 affixes to the left second arm 82 using bolts 110A and 110B through corresponding apertures 106A and 106B and finishing within apertures 108A and 108B located upon the frontal end of the left arm 82.

As shown in FIG. 3, which is a frontal view of axle assembly, the inventor has included a pair of pulleys 112A and 112B to be connected by welding at the interior hollow areas of each stationary axle section 72. As illustrated in FIGS. 1 and 2 a cable 114 is joined with a conventional winch 116 at its proximal end. Conversely, the said cable is affixed to a stationary section 72 by means of an aperture 118, illustrated in FIG. 5, located at the distal end of the cable 114. The cable is then threaded through the pulleys in a standard "block and tackle" formation. Referring to FIG. 6, a winch 116 is mounted to the approximate midsection point of a standard hitch 120.

Operation—FIGS. 1, 2, and 6

Operation of the trailer will now be discussed in connection with FIGS. 1, 2, and 6 beginning with storage of the trailer as shown in FIG. 2. The trailer 10 is stored in the collapsed position horizontally to attain the stowage position in a trapezoidal shape. The rotating suspension joints 52R and 52L and the collapsible arms 82 and 84 each work in in consort to retain the stationary sections 72 of the axle assembly in their respective perpendicular and parallel planes, be they in stowed or open configuration. Furthermore, the trailer 10 need not be supported by any other devices such as casters, support beams, or the like, but will be maintained by its' own permanently coupled axle assembly: a feature not provided for in the prior art.

In addition, a substantial conservation of space is provided in this folded position. When the collapsible trailer 10 is moved into its storage position as illustrated at FIG. 2, the trailer is only approximately thirty-six inches high and less that 36 inches deep: varying measurements of width and height being only applicable accordingly with the tires (not shown) chosen by the manufacturer of the device.

To utilize trailer 10, the device is rolled from storage and the hitch 120 is raised in the direction of arrow A of FIG. 6 so that the hitch is rotated to an approximately ninety-degree angle. As illustrated in FIG. 2 Pin set 12A and 12B are inserted through the front flange 16 through corresponding apertures 18R and 18L ending through apertures 24R and 24L (not shown) of the third central axial section 20. Winch 116 is then manipulated to sufficiently release the tension of cable 114, thereby affording opportunity of platform 11 to unfold downwardly. Secondly the operator need only grapple the wheel (not shown) or an outer edge of either lateral section 48 or 50 and draw directly away from the center section 20 in order to direct trailer 10 to its load bearing, utility position as illustrated in FIG. 1. First and second arms 82 and 84 expand to retain the hubs 70 in their respective perpendicular planes during which rotating suspension joints 52 and 54 permit lateral sections 28 and 30 to rotate vertically within tubing 60 to a descent appropriate for utility. By the same accord, section hinges 26R and 26L flex to allow the sections 28 and 30 to move to an extreme open position, abutting rear flange 22, at central section 20, wherein the surfaces of adjoining sections 20, 28, and 30 are substantially coplanar and ready for use, as illustrated in FIG. 1.

Referring to FIGS. 2 and 6, in order to fold trailer 10, the operator need only crank winch 116, mounted to a standard hitch 120, resulting subsequently in a drawing of a cable 114 applying a taut force to the previously noted "block and tackle" formation comprised of pulleys 112A and 112B. This motion will result in sufficient pressure required to draw axle sections 72, to a side by side proximity. At the same intervening time, collapsible arms 82 and 84 are compressed to permit movement of hubs 70, and their corresponding stationary sections 72, respectively.

It should be noted that the inventor has stipulated that section hinges 26R and 26L be affixed in such a manner as to allow both sections 28 and 30 to point downwardly at an angle of approximately 175 degrees, thus ensuring that an upward ascent of force will be employed when drawing cable 114. In construction it has been found that if section hinges 26R and 26L were joined to said first and second sections 28 and 30 and thereby retaining the platform 11 in a coplanar horizontal angle of 180 degrees would subsequently render undesirable force to the outer edge of said central section 20 of trailer 10. The cable 114 when drawn would apply considerable pressure to the exterior central section 20 and would therefore be unable to engage hinges 26R and 26L, and consequently be unable to permit movement of lateral sections 28 and 30.

As the arms 82 and 84 are compressed, axial section 20 ascends as rotating suspension joints 52R and 52L allow sections 28 and 30 movement via tubing 60 to a suitable position for trailer 10 stowage position as seen in FIG. 2. Cylindrical flanges 64A and 64B abut central section 20, thus stopping first and second sections 28 and 30 as they travel to the storage position. Referring to FIGS. 2 and 6 the operator then removes pins 12A and 12B from front flange 16 and lowers hitch 120. Trailer 10 may then be readied for stowage by wheeling the unit to its desired storage area, garage, or the like.

Conclusions, Ramifications, and Scope

Thus the reader will see that the collapsible integrant of the trailer provides a highly reliable, easily storable, yet convenient and durable platform which may be quickly and easily collapsed for storage. Furthermore the trailer has additional advantages in that it permits the production of collapsible trailers in a variety of sizes whose platform is capable of sustaining great weights;

it allows the trailer to be collapsed for storage without the need to detach various panels, wheel assemblies, or the like and consequently sacrifice ease of use by a consumer; and it provides a trailer with a superior platform upon which one may transport cargo items of ponderous size yet whose platform is able to provide a substantial conservation of space when stowed.

While the above description contains much specificity, these should not be construed as limitations on the application of the invention, but rather as an illustration by example of one preferred embodiment thereof. Several other variations are possible. For example, the above embodiment utilizes two longitudinal sections hingely mounted to a third central section. This is by of means example and the invention functions equally as well utilizing as few as two sections without the third central section. Additionally, the collapsible trailer may also be constructed as a doubled or tripled axle design in consort with their respective arms, not just a single axle design used by way of example. Lastly, the trailer may be easily converted to accommodate ramps or a back gate providing these are affixed sectionally so as not to impede operation of the embodiment.

It will be accordingly seen that the objects stated forth above, among those made apparent from the preceding description, are attained and, since particular alterations may be made to the above description without departing from the scope of the invention, it is intended that all matter within the above description or illustrated in the accompanying drawings shall be interpreted as illustrative and not in a limiting sense.

It is also understood that the scope of the invention should be determined not only by the embodiment as illustrated but the appended claims and their legal equivalents.

I claim:

1. A collapsible trailer adapted to prevent selective disassembly of the device by user, the collapsible trailer comprising:
   a) a pair of longitudinal bed sections having inner and outer edges,
   b) central bed section,
   c) said pair of longitudinal bed sections and said central bed section forming a platform for supporting for supporting objects thereon, wherein each said inner edge of said longitudinal bed sections form a longitudinal pivot axis, and wherein each said longitudinal bed sections and said central bed section are pivotally interconnected by a hinge member co-located with said longitudinal pivot axis; and whereby said platform has an open position and a closed position; (1) wherein when said pair of longitudinal bed sections and said central bed section are in said open position all said sections are substantially co-planar and, (2) wherein when said pair of longitudinal bed sections and said central bed section are in said closed position all said bed sections form a box-like enclosure, said box-like enclosure being generally trapezoidal,
   d) wherein the improvement comprises at least one concurrent combination of (1) a suspension means interconnected to said outer edges, and (2) at least one axle assembly enabling selective movement of said outer edges of said longitudinal bed sections between said open and closed positions; said suspension means further comprising: (1) at least one suspension joint axially aligned and disposed around each said outer edge for enabling vertical rotation of said longitudinal sections; and (2) a leaf spring attached below said outer edges said leaf spring having a top and a base, and (3) a plurality of spring hangers securing each said top disposed underneath said suspension joint, said leaf spring secured to said axle at said base.

2. The collapsible trailer of claim 1, wherein said axle assembly comprises:
   (1) said leaf springs, (2) a wheel assembly with a hub, and (3) a set of arm members having extending and expanding capabilities; said arm members each having a proximal end and a first and second end, wherein said arm members are capable of being pivotally interconnected to each other at said proximal ends by a flange, glidingly connecting said first and said second ends upon two predetermined locations of said axle assembly, (1) wherein an aperture is adapted to receive a kingpin after extending through said first end, and (2) wherein said aperture is adapted to receive said kingpin after extending through said second end.

3. The collapsible trailer in claim 1, wherein said suspension joint further comprises a tubular member, said tubular member and said outer edge being complimentary configured for enabling sliding telescopic reception of said of said outer edge and said tubular member into said outer edge and for establishment of a rotatable connection therebetween, wherein said tubular members are constructed and arranged as to permit vertical rotation of said outer edges at said open position of said platform.

4. The collapsible trailer of claim 1, wherein said platform is structurally maintained by a plurality of support members welded atop said longitudinal bed section of predetermined relation, said suspension joint contiguous to said outer edges and said support members.

5. The collapsible trailer of claim 1, wherein said longitudinal sections further comprises a distal end wherein a pair of cylindrical flanges ventrally welded to said distal end and wherein said closed position said cylindrical flanges bearing against said central bed section.

6. A collapsible trailer for obviating detachment of components of the device by a user, the collapsible trailer comprising:
   a) a pair of longitudinal bed sections having an inner edge, and first and second outer edge, and an upper surface and lower surface,
   b) a central bed section having a frontal end, disposed between said longitudinal bed sections and generally parallel to the ground,
   c) at least one axle assembly,
   d) said pair of longitudinal bed sections and said center bed section forming a platform for supporting objects thereon, said pair sections and said center sections being pivotally interconnected by at least one hinge located at each said inner edges thereof and extending along said central section and forming a longitudinal pivot axis therebetween,
   e) a first means for coevally actuating (1) said axle assembly, (2) said pair of bed sections, and (3) said central bed section to an open position and a closed position; and,
   a second means for coevally actuating (1) said axle assembly, (2) said pair of longitudinal bed sections and (3) said central bed section to said open and said closed positions; and
   f) wherein one of the said means for coevally actuating (1) said axle assembly, (2) said pair of longitudinal bed sections, and (3) said central bed section is comprised of a set of aim members pivotally connected to said axle assembly to facilitate movement by expanding or compressing thereby permitting said platform and said axle assembly to said open and and said closed positions.

7. The collapsible trailer of claim 6, wherein said axle assembly further comprises a wheel assembly with a hub, at least one leaf spring, and said arm members.

8. The collapsible trailer of claim 6, wherein the second means for coevally actuating (1) said axle assembly, (2) said longitudinal sections, and (3) said central bed section to said open and closed positions is comprised of a suspension joint, further comprised of a tubular member, axially aligned and disposed around each said outer edge to rotatably engage said outer edges, said tubular members so positioned wherein said arm members are compressed, said tubular members permit rotation of said center section, which ascends, and said outer edges to said closed position; said open attained wherein said arm members expand, whereby retaining said hub and said wheel assembly in a perpendicular and parallel plane, said outer edges rotate vertically by means of said tubular members.

9. The trailer of claim 6, said central bed section having a rear flange which engages said longitudinal bed sections as to create a stopping point as the said longitudinal sections are rotated vertically as said platform is moved to said open position, thereby retaining said platform in parallel relation when said platform is placed in said open position.

10. The collapsible trailer as described in claim 6, further comprising an axle so modified and constructed as to facilitate movement of said axle assembly by actuating said arm members; whereby rotating the said platform wherein said first outer edge is distal from said second outer edge and said upper surfaces are co-planar in said open position; and whereby rotating said platform wherein the first outer edge is closer and parallel to said second outer edge with the said central section disposed therebetween, without the need of disassembly.

11. The trailer of claim 6, including a hitch rotatable to a predetermined angle in order to facilitate said platform to said open position.

12. The trailer of claim 6, including a front flange mounted to said hitch so proportioned and adapted as to contain at least one set of apertures as to permit manual insertion of pins through said apertures, and ending through an additional aligned set of apertures located upon said frontal end of said central bed section; thereby stabilizing said hitch in an upright position.

* * * * *